US009666851B2

(12) United States Patent
Ha et al.

(10) Patent No.: US 9,666,851 B2
(45) Date of Patent: May 30, 2017

(54) SEPARATOR AND ELECTROCHEMICAL DEVICE HAVING THE SAME

(71) Applicant: LG Chem, Ltd., Seoul (KR)

(72) Inventors: Jeong-Min Ha, Daejeon (KR); Jong-Hun Kim, Daejeon (KR); Su-Jin Yoon, Daejeon (KR); Byeong-Gyu Cho, Daejeon (KR); Jang-Hyuk Hong, Daejeon (KR); Da-Kyung Han, Daejeon (KR)

(73) Assignee: LG Chem, Ltd. (KR)

( * ) Notice: Subject to any disclaimer, the term of this patent is extended or adjusted under 35 U.S.C. 154(b) by 67 days.

(21) Appl. No.: 14/296,958

(22) Filed: Jun. 5, 2014

(65) Prior Publication Data

US 2014/0287296 A1 Sep. 25, 2014

Related U.S. Application Data

(63) Continuation of application No. PCT/KR2013/003723, filed on Apr. 30, 2013.

(30) Foreign Application Priority Data

Apr. 30, 2012 (KR) ........................ 10-2012-0045311
Apr. 30, 2013 (KR) ........................ 10-2013-0047941

(51) Int. Cl.
| | | |
|---|---|---|
| *H01M 2/16* | (2006.01) | |
| *H01M 2/14* | (2006.01) | |
| *D06N 3/00* | (2006.01) | |
| *D06N 3/12* | (2006.01) | |
| *H01M 10/052* | (2010.01) | |
| *H01M 10/0525* | (2010.01) | |

(52) U.S. Cl.
CPC ........ *H01M 2/1686* (2013.01); *D06N 3/0011* (2013.01); *D06N 3/12* (2013.01); *H01M 2/145* (2013.01); *H01M 2/162* (2013.01); *H01M 2/1646* (2013.01); *H01M 2/1653* (2013.01); *H01M 2/1666* (2013.01); *H01M 10/052* (2013.01); *H01M 10/0525* (2013.01)

(58) Field of Classification Search
CPC .. H01M 2/1686; H01M 2/1666; H01M 2/145; H01M 2/1653; H01M 2/162; H01M 2/1646; H01M 10/0525; H01M 10/052; H01M 4/14–4/1686; D06N 3/12; D06N 3/0011; Y02T 10/7011
See application file for complete search history.

(56) References Cited

U.S. PATENT DOCUMENTS

| | | | |
|---|---|---|---|
| 6,159,634 A | 12/2000 | Yen et al. | |
| 6,447,958 B1 | 9/2002 | Shinohara et al. | |
| 2004/0142245 A1 | 7/2004 | Ishikawa et al. | |
| 2005/0019665 A1 | 1/2005 | Adachi et al. | |
| 2005/0255769 A1 | 11/2005 | Henninge et al. | |
| 2007/0178349 A1 | 8/2007 | Iino et al. | |
| 2010/0203396 A1* | 8/2010 | Murata ............... | H01M 2/1653 429/247 |
| 2011/0256443 A1 | 10/2011 | Park et al. | |
| 2011/0305941 A1 | 12/2011 | Park et al. | |
| 2012/0015228 A1 | 1/2012 | Yoon et al. | |

FOREIGN PATENT DOCUMENTS

| | | |
|---|---|---|
| JP | H1140130 A | 2/1999 |
| JP | 2000030686 A | 1/2000 |
| JP | 2001126697 A | 5/2001 |
| JP | 2008-041606 A | 2/2008 |
| JP | 2010050024 A | 3/2010 |
| JP | 2010218749 A | 9/2010 |
| JP | 2011048969 A | 3/2011 |
| JP | 2011-528842 A | 11/2011 |
| JP | 2011-528843 A | 11/2011 |
| KR | 20030068017 A | 8/2003 |
| KR | 100546031 B1 | 1/2006 |
| KR | 20060097755 A | 9/2006 |
| KR | 100877161 B1 | 1/2009 |
| KR | 20100092988 A | 8/2010 |
| WO | 2004/020511 A1 | 3/2004 |
| WO | WO 2010/024559 * | 3/2010 ............ H01M 2/162 |

OTHER PUBLICATIONS

Internaional Search Report for Application No. PC/KR2013/003723 dated Sep. 5, 2013.
Nishina Tatsuo, "Express Charging/Discharging Lithium Ion Secondary Batteries." FB Technical News, No. 64 (Nov. 2008), pp. 3-18.
Jung-Ran Lee, et al., "SiO2-coated polyimide nonwoven/Nafion membranes for proton exchange membrane fuel cells," Journal of Membrane Science, Elsevier BV, NL, vol. 367, No. 1-2, Feb. 1, 2011, pp. 265-272, XP027554334, ISSN: 0376-7388 (retrieved on Dec. 9, 2010).
Eun-Sun Choi et al., "Particle size-dependent, tunable porous structure of a SiO2/poly(vinylidene fluoride-hexafluropropylene)-coated poly(ethylene terephthalate) nonwoven composite separator for a lithium-ion battery." Journal of Materials Chemistry, vol. 21, No. 38, Aug. 18, 2011, pp. 14747, XP055209576, ISSN: 0959-9428, DOI: 10.1039/c1jm12246k.

(Continued)

*Primary Examiner* — Cynthia K Walls
(74) *Attorney, Agent, or Firm* — Lerner, David, Littenberg, Krumholz & Mentlik, LLP

(57) ABSTRACT

The present invention refers to a separator and an electrochemical device having the same. The separator of the present invention comprises a non-woven fabric substrate obtained from fibers and having multiple pores formed between the fibers; and a polymer coating layer formed on a part or the whole of the surface of the fibers, wherein the polymer coating layer comprises a polymer having a tensile strength of 80 MPa or more, a tensile modulus of 3,000 MPa or more and a flexural modulus of 3,000 MPa or more.
The separator of the present invention can reduce costs for manufacturing electrochemical devices, and it can control the size of pores present in the non-woven fabric substrate to prevent the generation of a leak current and provide improved mechanical strength.

12 Claims, No Drawings

(56) References Cited

OTHER PUBLICATIONS

Extended Search Report from European Application No. 13 78 4183, dated Sep. 10, 2015.
Trigo, et al., "Aromatic Polyamides." Handbook of Thermoplastics, Second Edition, Jan. 15, 2016, CRC Press, KP055292681, ISBN: 978-1-4665-7722-0, p. 301.
Paloheimo, "Tensile or Flexural Strength/Stiffness—is there really a difference? Plasticprop," Jul. 17, 2014, KP055292682, Retrieved from the Internet: URL:http://www.plasticprop.com/articles/tensile-or-flexural-strengthstiffness-there-really-difference [retrieved on Aug. 2, 2016].
Anonymous: "ULTEM™ Resin 1000," Jan. 12, 2015, XP055292700, Retrieved from the Internet: URL:https://www.sabic-ip.co m/gepapp/eng/weather/weatherhtml?sltUnit=Sl&sltRegionList=10020020000&sltPrd=1002003018&sltGrd=1002011252&sltModule=DATASHEETS&sltType=Online&sltVersion=Internet&sltLDAP=0 [retrieved on Aug. 22, 2016].
Office Action from European Application No. 13784183.9, dated Aug. 8, 2016.

\* cited by examiner

SEPARATOR AND ELECTROCHEMICAL DEVICE HAVING THE SAME

CROSS-REFERENCE TO RELATED APPLICATION

This application is a continuation of International Application No. PCT/KR2013/003723 filed on Apr. 30, 2013, which claims priority under 35 USC 119(a) to Korean Patent Application No. 10-2012-0045311 filed in the Republic of Korea on Apr. 30, 2012 and Korean Patent Application No. 10-2013-0047941 filed in the Republic of Korea on Apr. 30, 2013, the disclosures thereof are incorporated herein by reference.

TECHNICAL FIELD

The present invention relates to a separator for an electrochemical device such as a lithium secondary battery, and an electrochemical device having the same. More particularly, the present invention relates to a separator comprising a non-woven fabric substrate having multiple pores, and an electrochemical device having the same.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly prohibit the dangers (such as fire and smoke emission) of electrochemical devices. Overheating of an electrochemical device may cause thermal runaway or a puncture of a separator may pose an increased risk of explosion. In particular, when a porous substrate of a non-woven fabric is used as a separator for electrochemical devices, costs for preparing the separator can be reduced, but the mechanical strength thereof becomes weak due to the low tensile strength, tensile modulus and flexural modulus of the porous substrate and the insufficient binding of fiber strands in the porous substrate. For this reason, the separator using the non-woven porous substrate may be ruptured during the preparation of electrochemical devices. Also, due to the non-woven fabric substrate having large pores, a leak current may occur during battery operation to deteriorate the insulating property of the separator.

DISCLOSURE

Technical Problem

Accordingly, the present invention is designed to solve the above-mentioned problems, and therefore it is an object of the present invention to provide a separator which can prevent the generation of a leak current by improving the mechanical strength of a non-woven fabric substrate used in the preparation of a separator and controlling the pore size of the substrate, and an electrochemical device having the separator.

Technical Solution

In accordance with one aspect of the present invention, there is provided a separator comprising a non-woven fabric substrate obtained from fibers and having multiple pores formed between the fibers; and a polymer coating layer formed on a part or the whole of the surface of the fibers, wherein the polymer coating layer comprises a polymer having a tensile strength of 80 MPa or more, a tensile modulus of 3,000 MPa or more and a flexural modulus of 3,000 MPa or more.

In the present invention, the fibers may have a thickness of 0.01 to 10 μm.

The non-woven fabric substrate may comprise pores having a large diameter of 0.05 to 70 μm by 50% or more based on the total number of pores. Also, the non-woven fabric substrate may have a porosity of 30 to 80%, and a thickness of 10 to 30 μm.

The polymer used in the present invention may be any one selected from the group consisting of polyamide ether ketones (PAEK), polyimides (PI), polyamides (PA), polyphenylene sulfones (PPSU), polyphenylene ethers (PPE), polyether sulfones (PES), polyether ether ketones (PEEK), polybenzo imidazoles (PBI), polyether imides (PEI), polyamideimides (PAI), poly(p-phenylene-2,6-benzobisoxazoles), epoxy resins and a mixture thereof.

The separator may further comprise multiple inorganic particles adhered on the polymer coating layer.

In the present invention, the inorganic particles may have an average diameter of 0.001 to 10 μm and may be any one selected from the group consisting of $BaTiO_3$, $Pb(Zr,Ti)O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ and a mixture thereof.

The inorganic particles may be present in an amount of 100 to 10,000 parts by weight based on 100 parts by weight of the polymer.

The separator may have a porosity of 5 to 50%, and may satisfy the following equation (1):

$$0.5<(W_2/D_2)/(W_1/D_1)<3.5 \quad (I)$$

wherein, $W_1$ is a weight per 1 $m^2$ of the non-woven fabric substrate, $D_1$ is a density of the non-woven fabric substrate, $W_2$ is a weight of the polymer present in 1 $m^2$ of the polymer-coating layer, and $D_2$ is a density of the polymer.

Further, in accordance with another aspect of the present invention, there is provided an electrochemical device comprising a cathode, an anode, a separator interposed between the cathode and the anode and an electrolyte solution, wherein the separator is defined in the present invention. The electrochemical device may be a lithium secondary battery.

Advantageous Effects

According to one embodiment of the present invention, a relatively cheap non-woven fabric substrate can be used in the preparation of a separator to reduce costs for manufacturing electrochemical devices.

Also, a polymer coating layer is formed on fibers composing the non-woven fabric substrate to improve the tensile strength, tensile modulus and flexural modulus of the non-woven fabric substrate and largely raise the strength of the intersection point in which fiber strands are encountered with each other, thereby enhancing the mechanical strength of the separator.

In addition, the fibers become thick by the polymer coating layer, thereby suitably controlling the size of pores present in the non-woven fabric substrate. From this, the generation of a leak current can be prevented, thereby prohibiting the insulating property of electrochemical device from being deteriorated.

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Accordingly, the embodiments proposed herein is just a preferable example for the purpose of illustrations only, not intended to limit the scope of the disclosure, so it should be understood that other equivalents and modifications could be made thereto without departing from the spirit and scope of the disclosure.

The separator of the present invention comprises a non-woven fabric substrate obtained from fibers and having multiple pores formed between the fibers; and a polymer coating layer formed on a part or the whole of the surface of the fibers, wherein the polymer coating layer comprises a polymer having a tensile strength of 80 MPa or more, a tensile modulus of 3,000 MPa or more and a flexural modulus of 3,000 MPa or more.

The fibers forming the non-woven fabric substrate may have a thickness of 0.01 to 10 μm, that is, they may be nano-sized. Preferably, the fibers may have a thickness of 0.1 to 7 μm. When the average thickness of the fibers satisfies such a numerical range, it becomes easier to prepare a non-woven fabric and control the pore size of the non-woven fabric substrate, and the mechanical strength of the non-woven fabric substrate can be improved.

The fibers may be made of polyolefins such as polyethylenes and polypropylenes, polyesters such as polyethylene terephthalate and polybutylene terephthalate, polyamides such as aramid, polyacetals, polycarbonates, polyimides, polyether ether ketons, polyether sulfones, polyphenylene oxides, polyphenylene sulfide, or polyethylene naphthalene, but the present invention is not limited thereto. In particular, in order to improve the thermal stability of the non-woven fabric substrate, it is preferred that the fibers have a melting point of 200° C. or higher.

The non-woven fabric substrate formed from the fibers may comprise pores having a large diameter of 0.05 to 70 μm by 50% or more based on the total number of pores. When the large diameter of pores satisfies such range, it becomes easier to prepare a non-woven fabric, and the transfer of lithium ions can be smoothly facilitated, and the decrease of insulating property due to a leak current can be prevented. Accordingly, when pores having such a size are 50% or more of the total number of pores, the constitution and porosity of the non-woven fabric substrate can be optimally designed, thereby achieving the object of the present invention.

Also, the non-woven fabric substrate may have a porosity of 30 to 80%, and a thickness of 10 to 30 μm. When the thickness of the non-woven fabric substrate satisfies such range, it can prevent a short circuit between a cathode and an anode and provide electrochemical devices having high capacity.

In the separator of the present invention, the polymer contained in the polymer coating layer may be any one selected from the group consisting of polyamide etherketones (PAEK), polyimides (PI), polyamides (PA), polyphenylene sulfones (PPSU), polyphenylene ethers (PPE), polyether sulfones (PES), polyether etherketones (PEEK), polybenzo imidazoles (PBI), polyether imides (PEI), polyamideimides (PAI), poly(p-phenylene-2,6-benzobisoxazoles), epoxy resins and a mixture thereof.

The polymer coating layer containing such a polymer is formed on a part or the whole of the surface of the fibers composing the non-woven fabric substrate to improve the tensile strength, tensile modulus and flexural modulus of the non-woven fabric substrate, thereby enhancing the mechanical strength of the separator. From this, the separator may be prevented from rupturing during the preparation of electrochemical devices. In addition, as the polymer coating layer is formed on the outer surface of the fibers, the thickness of the fibers increases and the size of pores in the non-woven fabric substrate decreases, thereby preventing the generation of a leak current and eventually preventing the insulating property of an electrochemical device from being deteriorated.

The separator of the present invention may further comprise multiple inorganic particles adhered on the polymer coating layer.

When the inorganic particles are adhered on the polymer coating layer, the pore size of the separator can decrease even more, thereby further enhancing the effect of preventing the generation of a leak current. Also, even though the separator is melted by the overheating of electrochemical devices, a short circuit between a cathode and an anode can be prevented.

The inorganic particles are not particularly limited if they are electrochemically stable. That is, the inorganic particles which may be used in the present invention are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher.

Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), SrTiO$_3$, SnO$_2$, CeO$_2$, MgO, NiO, CaO, ZnO, ZrO$_2$, Y$_2$O$_3$, Al$_2$O$_3$, SiC, TiO$_2$ and a mixture thereof.

Also, as the inorganic particles, inorganic particles having the ability to transport lithium ions, i.e., lithium-containing inorganic particles which can transfer lithium ions without holding them may be used. Non-limiting examples of the inorganic particles having the ability to transport lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13) such as 14Li$_2$O-9Al$_2$O$_3$-38TiO$_2$-39P$_2$O$_5$, lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5) such as Li$_{3.25}$Ge$_{0.25}$P$_{0.75}$S$_4$, lithium nitride (Li$_x$N$_y$, 0<x<4, 0<y<2) such as Li$_3$N, SiS$_2$ type glass (Li$_x$Si$_y$S$_z$, 0<x<3, 0<y<2, 0<z<4) such as Li$_3$PO$_4$-Li$_2$S—SiS$_2$, P$_2$S$_5$ type glass (Li$_x$P$_y$S$_z$, 0<x<3, 0<y<3, 0<z<7) such as LiI—Li$_2$S—P$_2$S$_5$, and a mixture thereof.

In the separator of the present invention, the inorganic particles are not particularly limited to their size, but preferably have an average diameter of 0.001 to 10 µm for achieving a proper porosity of the separator.

The inorganic particles may be present in an amount of 100 to 10,000 parts by weight, preferably 200 to 5,000 parts by weight, based on 100 parts by weight of the polymer. When the amount of the inorganic particles satisfies such range, a proper porosity of the separator can be achieved.

The separator of the present invention may have a porosity of 5 to 50%, preferably 15 to 40%.

When the porosity of the separator satisfies such numerical range, it is possible to form pores capable of effectively transferring lithium ions, prevent resistance increase by the separator and block a leak current.

In addition, the non-woven fabric substrate and the polymer comprised in the separator may satisfy a volume ratio represented by the following equation (I):

$$0.5<(W_2/D_2)/(W_1/D_1)<3.5 \qquad (I)$$

wherein, $W_1$ is a weight per 1 m$^2$ of the non-woven fabric substrate, $D_1$ is a density of the non-woven porous substrate, $W_2$ is a weight of the polymer present in 1 m$^2$ of the polymer-coating layer, and $D_2$ is a density of the polymer.

When the separator satisfies such range, pores present in the separator are connected with each other in three dimensions, thereby further improving the effect of transferring lithium ions.

The separator of the present invention is preferably prepared by a method described below, but the present invention is not limited thereto.

First, a non-woven fabric substrate obtained from fibers and having multiple pores formed between the fibers is provided.

Subsequently, a polymer, which has a tensile strength of 80 MPa or more, a tensile modulus of 3,000 MPa or more and a flexural modulus of 3,000 MPa or more, is dissolved in a solvent to obtain a coating solution, and the coating solution is coated on the non-woven fabric substrate.

The solvent which is used to dissolve the polymer may be one having a solubility parameter similar to that of the polymer to be used and a low boiling point, for easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), dimethylacetamide (DMAC), cyclohexane, water and a mixture thereof.

The coating may be carried out by way of dip coating, die coating, roll coating, comma coating, or a combination thereof. Also, the coating solution may be selectively coated on one or both surface(s) of the non-woven fabric substrate. By such a coating method, the coating solution may exist on the surface of the non-woven fabric substrate and even inside thereof, upon considering the characteristics of the non-woven fabric substrate.

Meanwhile, in the preparation of the coating solution, the inorganic particles as mentioned above may be further used in addition to the polymer and the solvent. When the coating solution comprises the inorganic particles, pore size can be effectively controlled and a short circuit between a cathode and an anode can be prevented even though the separator is melted by the overheating of electrochemical devices.

After coating, the non-woven fabric substrate coated with the coating solution is dried to remove the solvent, thereby finally preparing a separator having a polymer coating layer formed thereon.

The separator of the present invention thus prepared may be interposed between a cathode and an anode to prepare an electrochemical device.

The electrochemical device of the present invention may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

In the present invention, electrodes to be used together with the separator are not particularly limited, and may be manufactured by binding an electrode active material to an electrode current collector according to a conventional method known in the art. As a cathode active material, those that are commonly used in cathodes of conventional electrochemical devices may be used. Non-limiting examples of the cathode active material may include a lithium-manganese oxide, a lithium-cobalt oxide, a lithium-nickel oxide, a lithium-iron oxide, and a combination thereof, i.e., a lithium-containing composite oxide. Also, as an anode active material, those that are commonly used in anodes of conventional electrochemical devices may be used, and non-limiting examples thereof include metallic lithium, lithium alloys, and lithium intercalation materials such as carbon, petroleum coke, activated carbon, graphite and other carbonaceous materials. Non-limiting examples of a usable cathode current collector include aluminum foils, nickel foils and a combination thereof. Non-limiting examples of a usable anode current collector include copper foils, gold foils, nickel foils, copper alloy foils and a combination thereof.

The electrolyte solution which may be used in the present invention is obtained by dissolving or dissociating a salt in an organic solvent. The salt has a structure represented by A$^+$B$^-$ wherein A$^+$ is an alkali metal cation such as Li$^+$, Na$^+$, K$^+$ and a combination thereof and B$^-$ is an anion such as PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$, C(CF$_2$SO$_2$)$_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

The separator of the present invention may be applied in batteries by lamination or stack of the separator and the electrodes, and folding, as well as a conventional winding process.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

Example 1

(1) Preparation of Coating Solution

To methylene chloride as a solvent, polyether imide (PEI, sabic 1010-1010R) having a tensile strength of 120 MPa, a tensile modulus of 3,300 MPa and a flexural modulus of 3,500 MPa was added as a polymer, to obtain a coating solution containing PEI in an amount of 5 wt %.

(2) Preparation of Separator

The coating solution was coated on a non-woven fabric (Mitsubishi Paper Mills, Ltd., LP1540) by way of dip coating, followed by drying at room temperature for 12 hours, to prepare a separator.

Example 2

The coating solution prepared in Example 1 was dip-coated on the separator prepared in Example 1 once more, followed by drying at room temperature for 12 hours, to prepare a separator.

Example 3

The procedures of Example 1 were repeated except that N-methyl-2-pyrrolidone (NMP) was used as a solvent instead of methylene chloride, and polyamide imide (PAI, tarlon 4275) having a tensile strength of 133 MPa, a tensile modulus of 7,800 MPa and a flexural modulus of 7,300 MPa was used as a polymer instead of polyether imide (PEI), and the drying procedure was carried out at room temperature for 48 hours, to prepare a separator.

Example 4

The coating solution prepared in Example 3 was dip-coated on the separator prepared in Example 3 once more, followed by drying at room temperature for 48 hours, to prepare a separator.

Comparative Example 1

The procedures of Example 1 were repeated except that the coating of a non-woven fabric (Mitsubishi Paper Mills, Ltd., LP1540) was not carried out, to prepare a separator.

Comparative Example 2

The procedures of Example 1 were repeated except that N-methyl-2-pyrrolidone (NMP) was used as a solvent instead of methylene chloride, and polyvinylidene fluoride-co-hexafluoropropylene (PVDF-HFP) having a tensile strength of 21 MPa, a tensile modulus of 250 MPa and a flexural modulus of 271 MPa was used as a polymer instead of polyether imide (PEI), to prepare a separator.

Comparative Example 3

The coating solution prepared in Comparative Example 2 was dip-coated on the separator prepared in Comparative Example 2 once more, followed by drying at room temperature for 12 hours, to prepare a separator.

Test Example 1: Measurement of Tensile Strength

The separators prepared in Examples 1 to 4 and Comparative Examples 1 to 3 were cut into a piece having a size of 15 mm×100 mm to obtain a sample. Each sample was measured for its tensile strength according to ASTM-D882, and the results thereof are shown in Table 1. In this test, each sample was pulled at 50 mm/min with gradually increasing force until the sample breaks.

Test Example 2: Measurement of Puncture Strength

The separators prepared in Examples 1 to 4 and Comparative Examples 1 to 3 were cut into a piece having a size of 50 mm×50 mm to obtain a sample. A 1 mm-sized round tip was set to operate at 120 mm/min, and then each sample was measured for its puncture strength according to ASTM-D2852. The results thereof are shown in Table 1.

| Separator | Thickness (μm) | Weight (g/m$^2$) | Porosity (%) | Tensile strength (at break, MPa) | Puncture strength (at break, N) |
|---|---|---|---|---|---|
| Example 1 | 16.1 | 15.02 | 52 | 88 | 2.1 |
| Example 2 | 16.5 | 16.29 | 44 | 92 | 3.2 |
| Example 3 | 15.8 | 14.22 | 55 | 91 | 2.2 |
| Example 4 | 16.3 | 16.12 | 49 | 101 | 3.4 |
| Com. Example 1 | 15.5 | 12.37 | 63 | 68 | 1.3 |
| Com. Example 2 | 16.1 | 15.40 | 49 | 69 | 1.2 |
| Com. Example 3 | 16.9 | 16.01 | 42 | 72 | 1.4 |

As shown in Table 1, the separators of Examples had higher tensile strength and puncture strength as compared with those of Comparative Examples. That is, it was confirmed that the coating of a polymer which has a high tensile strength, tensile modulus and flexural modulus on a non-woven fabric substrate allowed an increase in the strength of the separators.

The present invention has been described in detail above. However, it should be understood that the detailed description and specific examples, while indicating preferred embodiments of the present invention, are given by way of illustration only, since various changes and modifications within the spirit and scope of the disclosure will become apparent to those skilled in the art from this detailed description. Also, it should be understood that the Examples of the present invention are provided for the purpose of illustrations only and to better explain to a person having ordinary skill in the art, and is not intended to limit the scope of the present invention. Accordingly, the scope of the present invention to be protected should be decided by the claims attached, and other equivalents and modifications could be made thereto without departing from the spirit and scope of the present invention.

What is claimed is:

1. A separator, comprising:
   a non-woven fabric substrate comprising fibers and having multiple pores between the fibers; and
   a polymer coating layer disposed on a part or the whole of the surface of strands of the fibers,
   wherein the polymer coating layer comprises a polymer having a tensile strength ranging from 80 MPa to 133 MPa, a tensile modulus ranging from 3,000 MPa to 7,800 MPa, and a flexural modulus ranging from 3,000 MPa to 7,300 MPa,
   wherein the polymer is selected from the group consisting of polyamide ether ketones (PAEK), polyimides (PI), polyphenylene sulfones (PPSU), polyphenylene ethers (PPE), polyether sulfones (PES), polyether ether ketones (PEEK), polybenzo imidazoles (PBI), polyether imides (PEI), polyamideimides (PAI), poly(p-phenylene-2,6-benzobisoxazoles), epoxy resins and a mixture thereof.

2. The separator according to claim 1, wherein the fibers have a thickness of 0.01 to 10 μm.

3. The separator according to claim 1, wherein the non-woven fabric substrate comprises pores having a large diameter of 0.05 to 70 μm by 50% or more based on the total number of pores.

4. The separator according to claim 1, wherein the non-woven fabric substrate has a porosity of 30 to 80%, and a thickness of 10 to 30 μm.

5. The separator according to claim 1, which further comprises multiple inorganic particles adhered on the polymer coating layer.

6. The separator according to claim 5, wherein the inorganic particles have an average diameter of 0.001 to 10 μm, and are selected from the group consisting of $BaTiO_3$, $Pb(Zr,Ti)O_3$ (PZT), $Pb_{1-x}La_xZr_{1-y}TiO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ and a mixture thereof.

7. The separator according to claim 5, wherein the inorganic particles are present in an amount of 100 to 10,000 parts by weight based on 100 parts by weight of the polymer.

8. The separator according to claim 1, which has a porosity of 5 to 50%.

9. The separator according to claim 1, which satisfies the following equation (1):

$$0.5<(W_2/D_2)/(W_1/D_1)<3.5 \qquad (I)$$

wherein, $W_1$ is a weight per 1 m² of the non-woven fabric substrate, $D_1$ is a density of the non-woven fabric substrate, $W_2$ is a weight of the polymer present in 1 m² of the polymer-coating layer, and $D_2$ is a density of the polymer.

10. An electrochemical device, comprising a cathode, an anode and a separator interposed between the cathode and the anode, wherein the separator is defined in claim 1.

11. The electrochemical device according to claim 10, which is a lithium secondary battery.

12. A separator, comprising:
    a non-woven fabric substrate comprising fibers and having multiple pores between the fibers; and
    a polymer coating layer disposed on a part or the whole of the surface of strands of the fibers,
    wherein the polymer coating layer comprises a polymer having a tensile strength ranging from 80 MPa to 133 MPa, a tensile modulus ranging from 3,000 MPa to 7,800 MPa, and a flexural modulus ranging from 3,000 MPa to 7,300 MPa,
    wherein the separator which satisfies the following equation (1):

$$0.5<(W_2/D_2)/(W_1/D_1)<3.5 \qquad (I)$$

wherein, $W_1$ is a weight per 1 m² of the non-woven fabric substrate, $D_1$ is a density of the non-woven fabric substrate, $W_2$ is a weight of the polymer present in 1 m² of the polymer-coating layer, and $D_2$ is a density of the polymer.

* * * * *